US007334213B2

(12) United States Patent
Ohmori et al.

(10) Patent No.: US 7,334,213 B2
(45) Date of Patent: Feb. 19, 2008

(54) SOFTWARE DEVELOPMENT SUPPORT PROGRAM, RECORDING MEDIUM HAVING THE PROGRAM STORED THEREON AND SOFTWARE DEVELOPMENT SUPPORT SYSTEM

(75) Inventors: Tomohito Ohmori, Tokyo (JP); Seiki Sato, Tokyo (JP); Tokimune Kuroiwa, Tokyo (JP)

(73) Assignee: INCS Inc., Kanagawa (JP)

( * ) Notice: Subject to any disclaimer, the term of this patent is extended or adjusted under 35 U.S.C. 154(b) by 592 days.

(21) Appl. No.: 10/856,370

(22) Filed: May 28, 2004

(65) Prior Publication Data

US 2004/0243970 A1    Dec. 2, 2004

(30) Foreign Application Priority Data

May 29, 2003    (JP)    ............................. 2003-152209

(51) Int. Cl.
    *G06F 9/44*    (2006.01)
(52) U.S. Cl. ...................................................... 717/101
(58) Field of Classification Search ..................... None
    See application file for complete search history.

(56) References Cited

U.S. PATENT DOCUMENTS

| | | | |
|---|---|---|---|
| 5,734,837 A * | 3/1998 | Flores et al. ..................... 705/7 |
| 5,999,911 A * | 12/1999 | Berg et al. ....................... 705/9 |
| 6,041,306 A * | 3/2000 | Du et al. ......................... 705/8 |
| 6,073,109 A * | 6/2000 | Flores et al. ..................... 705/8 |
| 6,279,009 B1 * | 8/2001 | Smirnov et al. ......... 707/103 R |
| 6,574,675 B1 * | 6/2003 | Swenson ..................... 719/316 |
| 6,720,967 B1 * | 4/2004 | Cox et al. .................... 345/440 |
| 6,938,240 B2 * | 8/2005 | Charisius et al. ........... 717/104 |
| 7,051,036 B2 * | 5/2006 | Rosnow et al. ............. 707/102 |
| 7,051,071 B2 * | 5/2006 | Stewart et al. .............. 709/204 |
| 7,155,700 B1 * | 12/2006 | Sadhu et al. ................ 717/103 |
| 2003/0208743 A1 * | 11/2003 | Chong et al. ............... 717/106 |
| 2004/0143811 A1 * | 7/2004 | Kaelicke et al. ............ 717/101 |

OTHER PUBLICATIONS

Cusumano, Michael A; Selby, Richard W; How Microsoft Builds Software, p. 53-61, 1997 ACM.*
Guerrero, Luis A; Fuller, David A.; "A pattern system for the development of collaborative applications", Mar. 14, 2000 Elesevier.*
Shirado, William; Straka, William; Arkwright; Tom; Levay, Michael; Lundhold, Dean; "Software Porcess in Mixed R&D Environment", p. 315-326, 1996 IEEE.*

\* cited by examiner

*Primary Examiner*—Mary Steelman
(74) *Attorney, Agent, or Firm*—Martin Fleit; Paul D. Bianco; Fleit Kain Gibbons Gutman Bongini & Bianco P.L.

(57) ABSTRACT

Respective items of a software component, a development task and a required specification, which are enumerated as the requirement for performing the development of software products belonging to a certain category are first registered in recording means. In the registration of the development-task items, when a specific development-task item can be initiated only after the completion of one or more other development-task items at the time of the registration, the specific development-task item is registered together with ordinal information specifying the one or more other development-task items. Then, the operator is allowed to set up the correlations between any two of the software component, the development task and the required specification which have been registered by the item registration function, with respect to each of the items thereof, and information about the correlations is registered in the recording means.

4 Claims, 16 Drawing Sheets

SOFTWARE DEVELOPMENT SUPPORT PROGRAM, RECORDING MEDIUM HAVING THE PROGRAM STORED THEREON AND SOFTWARE DEVELOPMENT SUPPORT SYSTEM

BACKGROUND OF THE INVENTION

1. Field of the Invention

The present invention relates to a software development support system and program for supporting an operator who performs the development of a program to be incorporated in a certain product as software, using a function of presenting the content of a job to the operator and various other functions.

2. Prior Art

Heretofore, a new product belonging to a certain category (e.g. category of portable phones) has been typically developed by newly designing the shape, layout, mechanical/electrical elements of mechanism components or the like, and software elements if the product includes a computing unit, such as CPU, to be controlled thereby, except for the case of diverting major components of the product from existing ones.

In the present circumstances, most products including as portable phones are requited to bring a number of versions to the market within a short period of time, and to develop software for each of the product versions individually. As compared to the fields of mechanical and electrical designs, the standardization in the field of software developments has not been sufficiently advanced. Thus, each of new product developments inevitably involves jobs to be executed by skilled software engineers, and such a software development requires the largest person-hour in the product development. As a result, any new product development has to be set out on the condition of a long period for software development, which leads to cause delay in the introduction of new products to the market.

In view of the above circumstances, it is therefore an object of the present invention to provide a system and computer program for supporting an operator who performs software development, capable of allowing even inexperienced engineers to develop a new software product while maintaining a standard or higher level of design quality within a short development period of time.

SUMMARY OF THE INVENTION

In order to achieve the above object, the present invention provides a program and system for supporting an operator who performs the development of software products belonging to a given category.

Specifically, in this program or system, respective items of a software component, a development task and a required specification, which are enumerated as the requirement for performing the development of software products belonging to the above category are first registered in recording means. In the registration of the development-task items, when a specific development-task item can be initiated only after the completion of one or more other development-task items at the time of the registration, the specific development-task item is registered together with ordinal information specifying the one or more other development-task items. Then, the operator is allowed to set up the correlations between any two of the software component, the development task and the required specification which have been registered by the item registration function, with respect to each of the items thereof, and information about the correlations is registered in the recording means.

In the development of specific one of the software products belonging to the category, the required-specification items are presented to the operator to prompt the operator to determine the content of a final required specification while performing addition, alteration and/or deletion on the required-specification items, if required. Then, the software-component items correlated with the determined required specification are extracted from the recording means in accordance with the determined required specification and the correlation information, and presented to the operator so as to prompt the operator to determine a final software component while performing addition, alteration and/or deletion on the extracted software-component items, if required. The development-task items correlated with the determined software component are extracted from the recording means in accordance with the determined software component and the correlation information, and one or more of the development-task items which can be initiated at that time are presented to the operator in accordance with the ordinal information. After the operator initiates a job for one of the executable development-task items, the contents of the one or more development-task items which can be executed at each time point is presented to the operator in accordance with the selected development task, to support the operator on the execution of the job.

The above program or system may be configured such that when the operator executes a job of one of the development-task items, a plurality of job items to be executed in the job is enumerated, and each of the job items is allowed to be marked every time one of the job items is completed, wherein the development task is allowed to go into its completed status only after all of the job items are marked.

Other objects and advantages of the present invention will be understood from the following description of some preferred embodiments, which are shown in accompanying drawings:

DESCRIPTION OF PREFERRED EMBODIMENTS

Figure 1:
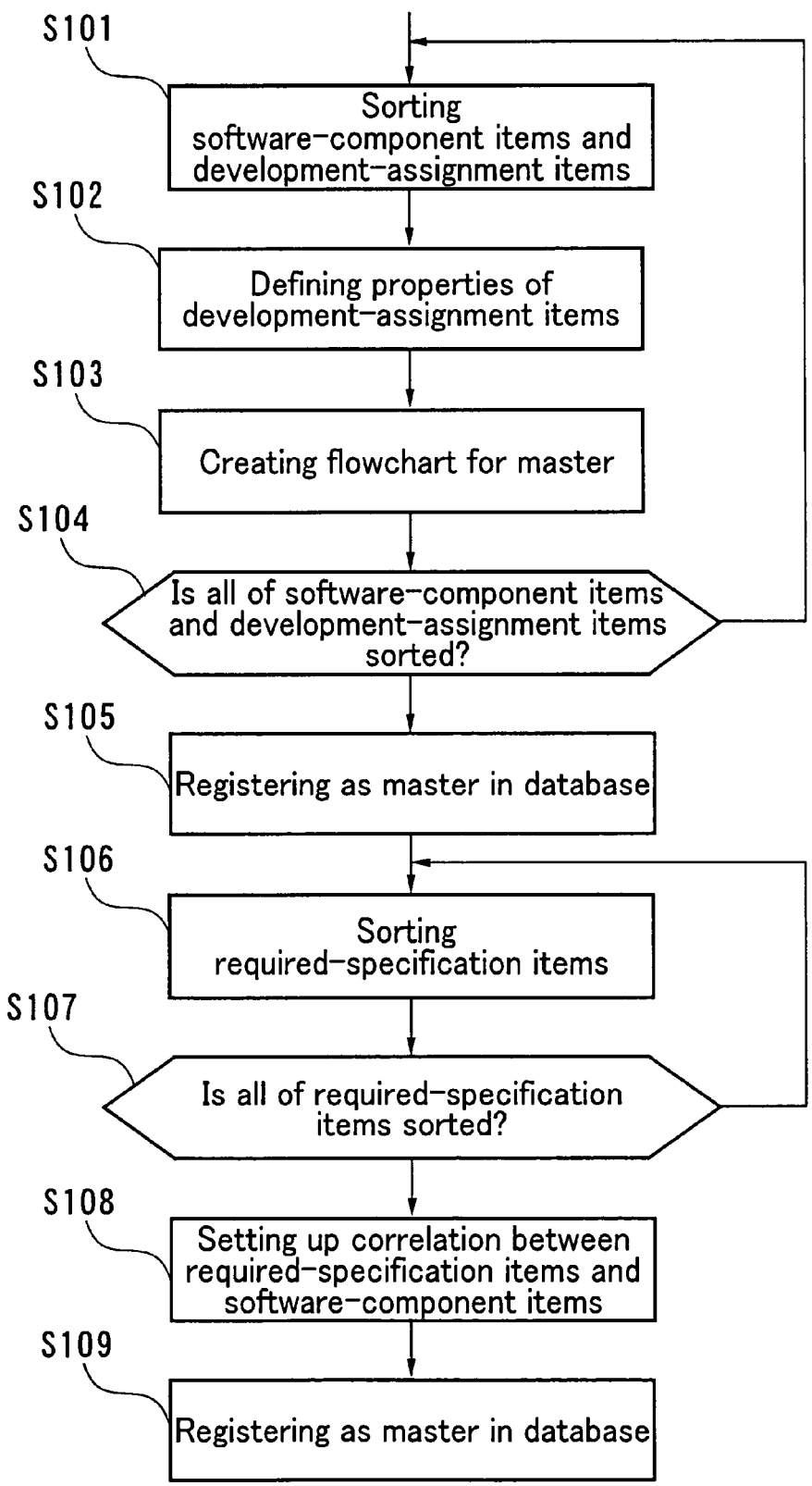
FIG. 1 is a flowchart showing a procedure of jobs to be executed by an operator itself and computer in a setup mode.

With reference to the drawings, a software-development navigation system achieved as one embodiment of the present invention will now be described. The software-development navigation system according to this embodiment fundamentally comprises a computer, and a computer program executable on the computer. In other words, the software-development navigation system is a computer having a software-development-navigation program installed therein.

In view of the operation of an operator, the operation mode of the software-development navigation system can be roughly classified into two modes: "setup mode" and "execution mode".

The ultimate object of the system according to this embodiment is to navigate an operation in such a manner that even if the operator is inexperienced in software development, he/she can execute a job or procedure for developing a software product, quickly at a standard or higher level. In order to achieve such an object, it is essentially required to accumulate extensive information required for navigating the development task, or information about software products belonging to the same category as that of the target software product. The "setup mode" is a mode for accumulating information required for such navigation. In this embodiment, accumulated information about software products belonging to a specific category, which is established in the setup mode, is referred to as "master".

One future of the system according to this embodiment is in that when a computer program as a specific software product is divided into a number of standardized elements or software components to develop a new software product, these software components are used without modification as much as possible.

A job for preparing such standardized software components is generally executed in the setup mode. However, a specific software product belonging to the category cannot be always developed only by combining software components prepared in advance, but it is required to execute new coding jobs for a part of the software product in some cases. For these cases, the system is configured such that a newly coded portion can also be registered as a new software component to allow the registered software component to be used in the developments of new software products in future.

There has been known a technical concept of segmentalizing a computer program or software into a plurality of components, and appropriately combining the components according to intended purpose. However, if a software is simply segmentalized into a plurality of components, and the number of the components is increased, any operator inexperienced in software development cannot decide which of the components should be selected and how to combine them. From this point of view, the navigation system according to this embodiment is directed to navigate an operator in an after-mentioned manner allowing the operator to use adequate software components, so that if the operator is inexperienced in software development, he/she can perform a software development within a short period of time at a standard level.

The "execution mode" is a mode for navigating an operator who actually performs a job for developing a detailed portion of a specific software product belonging to a certain category, by use of a master for software products belonging to the category, which is established in the "setup mode", and various pre-registered informations.

For example, assuming the development of an application program for a portable phone, a skilled operator first registers all informations required for developing application programs for portable phones in the setup mode to establish a master. The established master is stored in a database of a computer. Subsequently, when the development of a new portable phone is initiated, a specification and various conditions of the product are given from a client. Thus, in the execution mode, an operator in charge of the development will incorporate appropriate software components while practically performing coding jobs for some portions, to meet the specification and conditions of the product, according to instructions of the navigation system with respect to each of jobs, so as to develop the application program.

For example, assuming the development of an application program to be installed in a product belonging to a category of portable phones, in the setup mode, the items of a specification (required specification) supposed to be required for application programs belonging to this category, the items of a software component (functions, classes, objects, etc.) constituting the application program, and the items of a development task to be executed by an operator in charge of the development are prepared in advance, and these items are correlated with each other on a computer, and registered in a database. That is, in the setup mode, informations required for navigating an operator who actually performs the development of a software product belonging to a certain category are prepared in advance of the initiation of jobs of the development In this case, the software-component items may include primary functions on telephone call, a function of displaying a calendar and/or clock on a liquid crystal display screen, a function of selecting one of melodies for signaling an incoming call, a database-like function of registering mail addresses and/or telephone numbers, and a function associated with a digital camera if it is incorporated in a portable phone. One portable phone product family includes one version having a digital camera function and another version having no such a function. Even in the development of a version where a digital camera function is newly incorporated, other functions can be developed by diverting software components of a previously developed version in some cases. Thus, in case of incorporating a digital camera function into a portable phone to be newly developed according to a user-demanded specification, while a software for controlling this digital camera function has to be newly developed if any previously developed software component for the function cannot be used, the remaining software components can be constructed by directly using existing applicable software components, if any.

[Setup Mode]

FIG. 1 is a flowchart showing a procedure of jobs to be executed by an operator and a computer in the setup mode.

Figure 2:
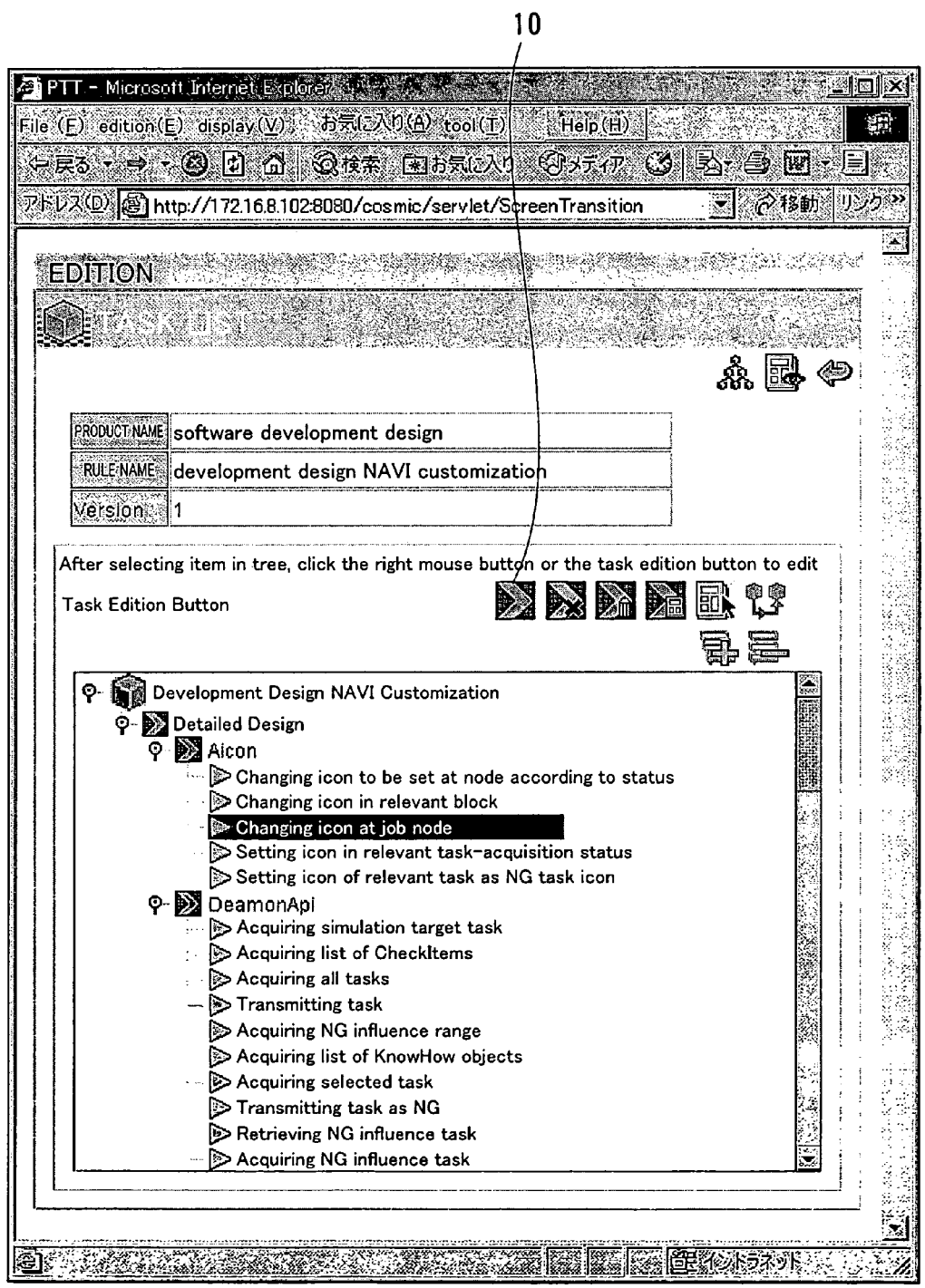
FIG. 2 is a diagram showing a basic window to be displayed just after a navigation system according to one embodiment of the present invention starts up and enters into the setup mode.

FIG. 2 is a basic window to be displayed just after the navigation system according to this embodiment starts up and goes into the setup mode. The following description will be made in connection with one example where this navigation system is used to set up a software itself of a new navigation system for users, only for the sake of simplicity.

Jobs in the setup mode are typically performed by a skilled operator, for example SE (System Engineer) experienced in software development of softwares belonging to this category or navigation systems.

A first job in the setup mode is to sort out the items of a software component supposed to be required in developing software belonging to this category, and the items of a development task supposed to be required for incorporating these software components into the system (S101). This sort-out job is performed by a skilled operator acquainted with software developments belonging to this category, in such a manner that he/she reviews conventional software developments.

The software component in this example mean a relatively small-size program described using an object-oriented program language and configured to allow a computer to execute a specific function. For example, assuming that a viewer for displaying some kind of image is set up on a computer screen in the development of a navigation system, a program for displaying the viewer may be one software component in itself.

If any intended software component is not prepared, a skilled operator will execute a coding job to develop the intended software component, and register the developed software component in a database. The following description will be made on the assumption that Java (registered trademark) classified into an object-oriented language is used as a program language for the coding. In Java, "class" corresponds to the software component.

The respective items of the sorted software component and the development task are enumerated on a window having a tree structure as shown in FIG. 2. This window is configured to allow the enumerated items to be readily subjected to addition, alteration and/or deletion. Thus, an operator may temporarily add any conceived item to the tree while leaving over the study on the order thereof. Further, even the finalized items are not totally used for creating a specific navigation system, but only necessary items are selectively used depending on a user-demanded specification of the navigation system. Thus, it is desired to enter all conceivable items software-component items and development-task items in this example).

While the tree in FIG. 2 has four levels, this window is configured to allow an operator to set up this hierarchy at any depth. In the system of this embodiment, this window is managed under a given rule in which the development-task items are enumerated in the lowest level, and the software-component items are enumerated in an upper level just next to the lowest level. According to this rule, each of the software-component items is internally correlated with the development-task items belonging to the lower level next to that of the software-component item, and these correlations are stored in the database. While a technique of correlating respective data with each other and storing the correlations is well known, the point of setting up the correlation between the software-component items and the development-task items is one of the futures of the present invention.

In the above manner, required development-task items can be sorted using each of the software-component items as a key in accordance with the stored correlation between the software-component items and the development-task items. Thus, the leakage in information can be minimized, and jobs for creating the specific navigation system can be efficiently executed. The technique of setting up the correlation between the software-component items and the development-task items is not limited to the above one. For example, a cell matrix having a horizontal axis for enumerating the software-component items and a vertical axis for enumerating the development-task items may be prepared, and the correlation between the development-task items on the vertical axis may be correlated with the software-component items on the horizontal axis may be set up by marking each of cells corresponding to respective items on the vertical and horizontal axes.

Figure 3:
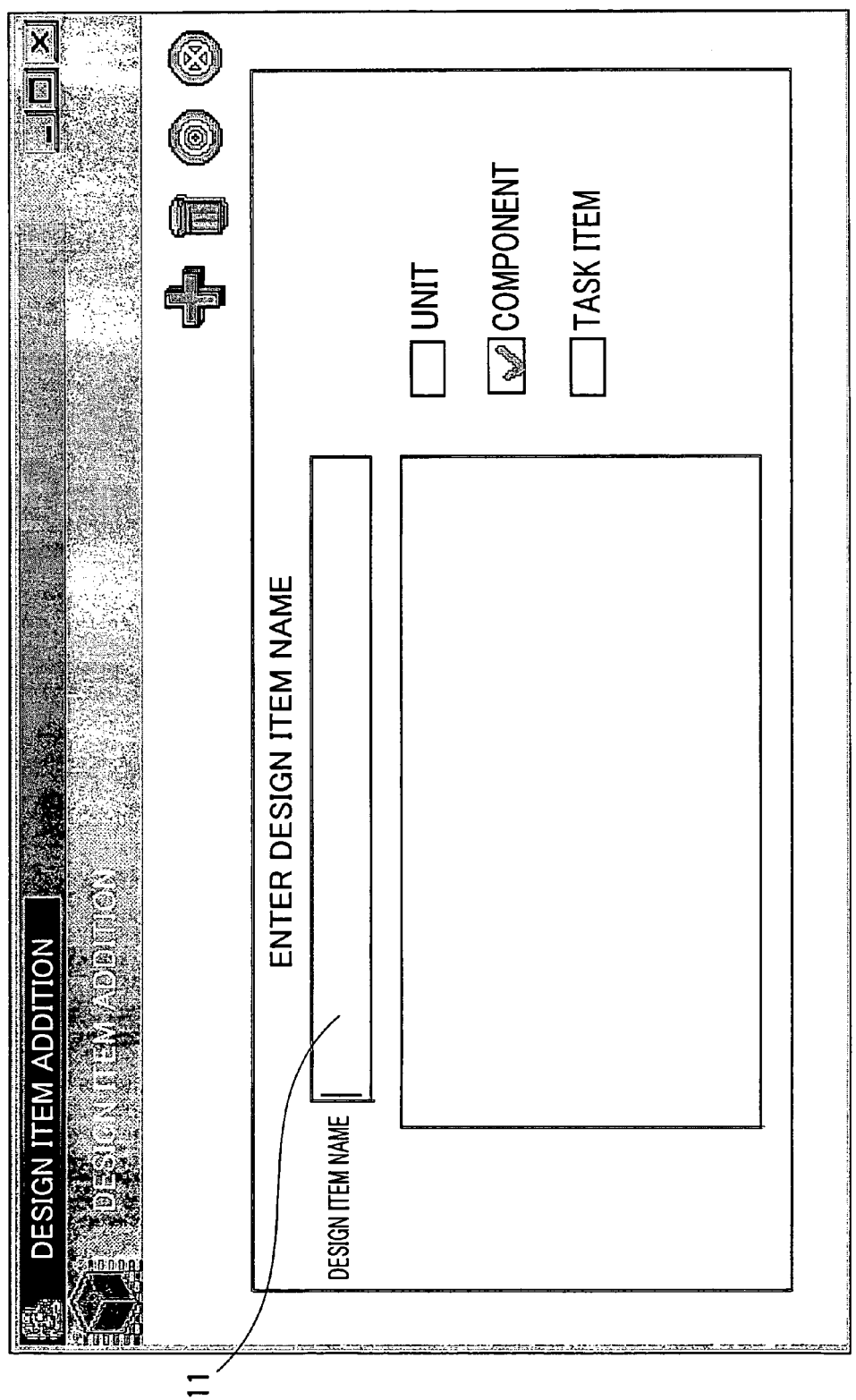
FIG. 3 is a diagram showing a window to be displayed in response to an operation for adding a new item to items displayed in a tree in FIG. 3.

When a new item is added in FIG. 2, an operator can click on an item-addition button 10 as shown in FIG. 2. In response to the clicking, a window as shown in FIG. 3 is displayed. Then, the operator enters an item name in a box designated by the reference numeral 11, and selects and clicks one of three options of "unit", "software component" and "development task". If the "development task" is selected, the entered item name will be added to the lowest level of the tree in FIG. 2. If the "software component" is selected, the entered item name will be added to the upper level next to the lowest level in the same tree. In this case, the "unit" is located at the upper level next to that of "software component" or a leading concept capable of summing up the software-component items and the development-task items.

The items enumerated as a list on a lower box in FIG. 2 and each having a rightward triangular icon on the left end thereof (the uppermost item has a name "Changing icon to be set at node according to status") are the development-task items supposed to be executed in creating the navigation system. The item at the upper level next to that of the development-task items is the software-component item. In FIG. 2, the items having names "Action" and "DeamonApi" correspond to the software-component items.

Figure 4:
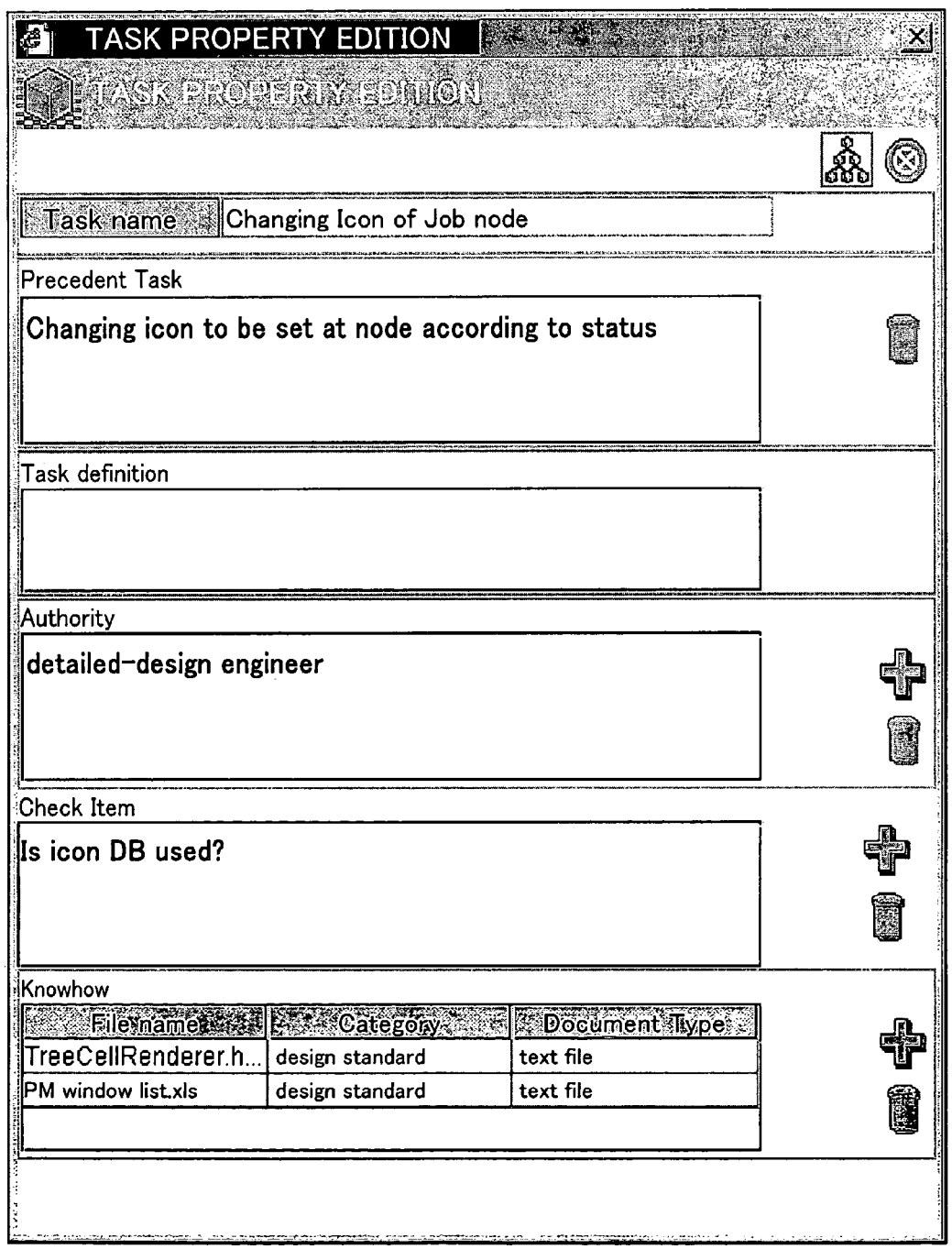
FIG. 4 is a diagram showing a property window for registering properties of a development-task item.

Then, information required for each of the development-task items enumerated as shown in FIG. 2 by a skilled operator on the assumption that they will be requited for creating the navigation system is defined using a property window as shown in FIG. 4. As one example, FIG. 4 shows a property window for a development-task item of "Changing icon at job node" displayed at the 3rd position from the top of FIG. 2. In order to define the properties of the development-task items, the operator clicks on one of the development-task items to be subject to an operation of defining properties, using the window in FIG. 2. Then, the operation enters necessary informations into the resulting displayed window in FIG. 4 to define the properties of the selected development-task item.

In FIG. 4, the "Changing icon at job node" means a function of automatically changing an icon for symbolically indicating a specific job to be displayed on a screen of a computer terminal to another icon. For example, it is a function of automatically changing icons displayed on February to express "skiing" to another icon expressing "Doll Festival" just after March comes.

FIG. 4 shows a window in the state after the development-task item of "Changing icon at job node" which has already been defined and registered are read out. When properties are initially defined, each of boxes in FIG. 4 is blank. In case of developing a software having a function of changing an icon at a job node, specifications and knowhows to be presented to an operation who actually performs the development are pre-entered and pre-registered to display them on the window in FIG. 4.

It is not necessary to present the window itself in FIG. 4 to an operation who actually performs the development in the execution mode. The informations entered through this window are used to instruct an operation who executes jobs of the development in the after-mentioned execution mode, by use of a window for navigation the jobs.

The uppermost input box titled "precedent task" on the window in FIG. 4 is used to define one or more development-task items which must have been completed to enable the development-task item of "Changing icon at job node" to be executed. This means that if one or more development-task items entered through this box have not been completed, the development-task item of "Changing icon at job node" cannot be executed. The "precedent task" designated by this box is reflected on a navigation operation for presenting information indicative of a specific development-task item executable in the after-mentioned execution mode, to an operator who actually executes the development-task item.

The "precedent task" box in FIG. 4 has an input of "Changing icon to be set at node according to status". This means a system environment such that a computer can execute a natural-language retrieval of the content entered in this box, and thus the computer can recognize the content to automatically identify the development-task item. Alternatively, the name of a development-task item may be directly entered. Otherwise, if a specific code or number is pre-assigned to each of development-task items, the code or number may be entered. That is, any suitable manner allowing any development-task item which must have been completed before the execution of the development-task item in question to be identified or specified may be used.

A box titled "task definition" just below the "precedent task" box is used to describe the content of the development-task item in question.

A box titled "authority" just below the "task definition" box is used to designate an operator who executes the development-task item in question. An input of "detailed-design engineer" displayed on this box means an operator who actually executes the development-task item in question, or a programmer.

A box titled "check item" just below the "authority" box has a registered input of "Is icon database used? This information is used to instruct an operator who actually performs the development to execute a job with reference to a given database or icon DB, when the operation views a displayed window of the navigation system. The registered contents as instructions for a detailed-design engineer will be reflected on a navigation window used in the detailed design. As described later, the navigation window is configured such that when a detailed-design engineer actually executes the development-task item executed with reference to the icon DB, the detailed-design engineer can write a check mark therein, but cannot go on a job unless the check mark is written therein, to assure that the detailed-design engineer refers to the icon DB.

A box titled "knowhow" just below the "check item" box is used to allow a skilled engineer to register various documents intended to be presented as knowhow to an operator who actually executes the development-task item. The documents to be registered through this box are stored in the computer as data files created by documentation programs such as Word and Excel (trademarks of Microsoft Co., Ltd.), and can be accessed from a computer terminal of the operator. Upon registration of a document file name to the "knowhow" box, a path necessary for accessing to the file is internally registered.

Figure 5:
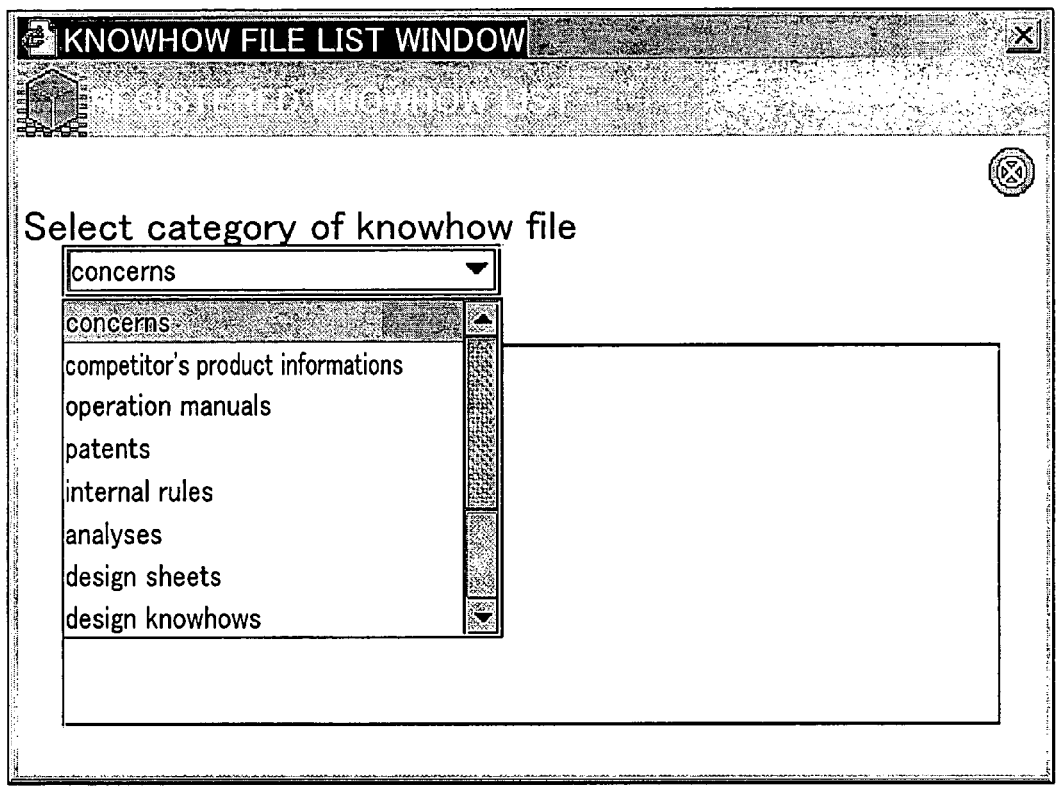
FIG. 5 is a diagram showing one example of a category prepared in advance to use when the "category" of knowhow is specified in a "knowhow" box in FIG. 4.

FIG. 5 shows one example of categories prepared in advance when the category of the knowhow is specified. When a skilled operator who establishes a master of the navigation system in the setup mode selects one category corresponding to knowhow to be registered, from the window in FIG. 5, the selected category is automatically inserted in the "category" box in FIG. 4.

Figure 6:
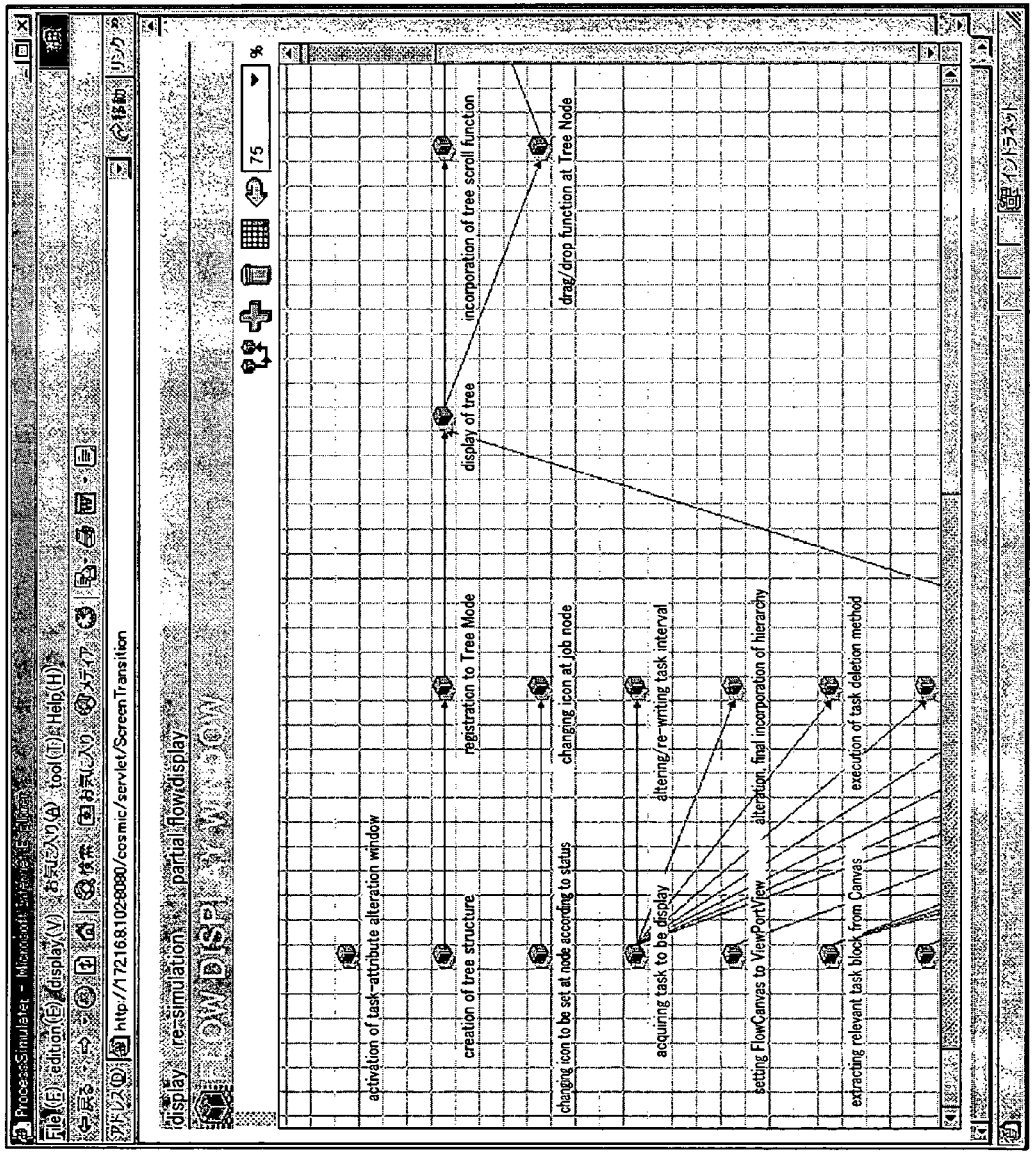
FIG. 6 is a diagram showing an example of a job flow diagram to be obtained in the setup mode.
Figure 7:
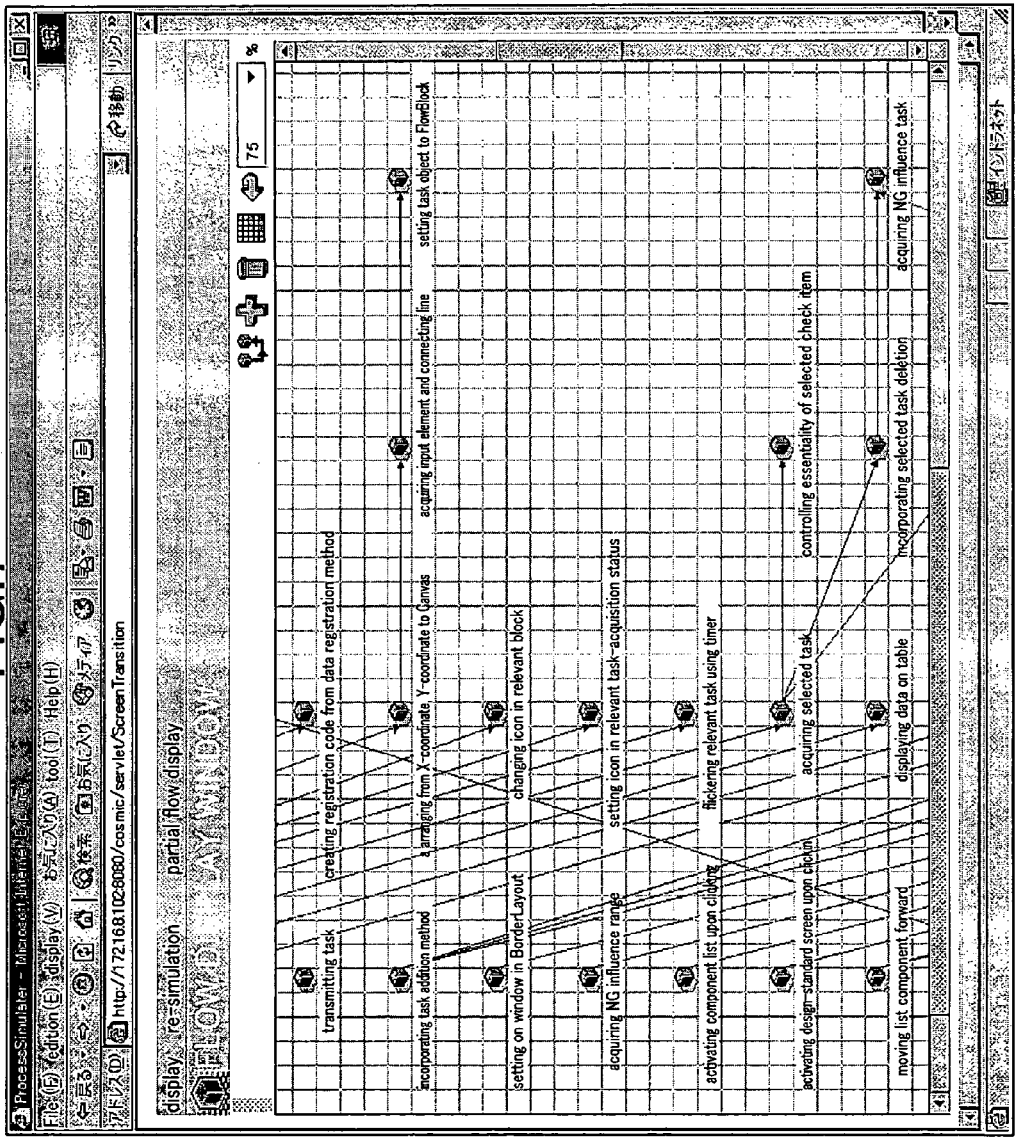
FIG. 7 is a diagram showing one example of a job flow diagram to be obtained in the setup mode.

After a plurality of development-task items are registered, and the ordinal relationship between the development-task items is described in the "precedent task" box, a job flow diagram can be created in accordance with this information about the ordinal relationship (S103). FIGS. 6 and 7 show one example of the job flow diagram. The ordinal relationship between the development-task items can be determined by the information from the "precedent task" box to allow the computer to automatically create the job flow diagram. While the job flow diagram is separated into two flowcharts in FIGS. 6 and 7 because the entire job flow diagram cannot be generally displayed on a single screen, it can be fully viewed by scrolling the window on the screen of a computer terminal.

In the process for sorting out required software-component items and development-task items, a skilled engineer can display the job flow diagram according to need to review whether the sorted items are sufficient or whether any unnecessary item is included in the sorted item, with reference to the job flow diagram, so as to perform addition, alteration and/or deletion on the development-task items.

As above, software-component items and development-task items supposed to be requited are sorted out, and enumerated in the window in FIG. 2 (S101). Then, after the properties of each of the development-task items are defined through the window in FIG. 4 (S102), these informations are registered in a database (S104, S105). In this embodiment, the informations registered in the database in this manner are referred to as "master" of the navigation system.

In the flowchart illustrated in FIG. 1, S101 "Sorting software-component items and development-task items" and S102 "Defining properties of development-task items" are not necessarily executed in this order. Specifically, immediately after one development-task item is sorted, the properties of the sorted development-task item may be defined. Similarly, S106 to S108 are not necessarily executed in this order.

Figure 8:
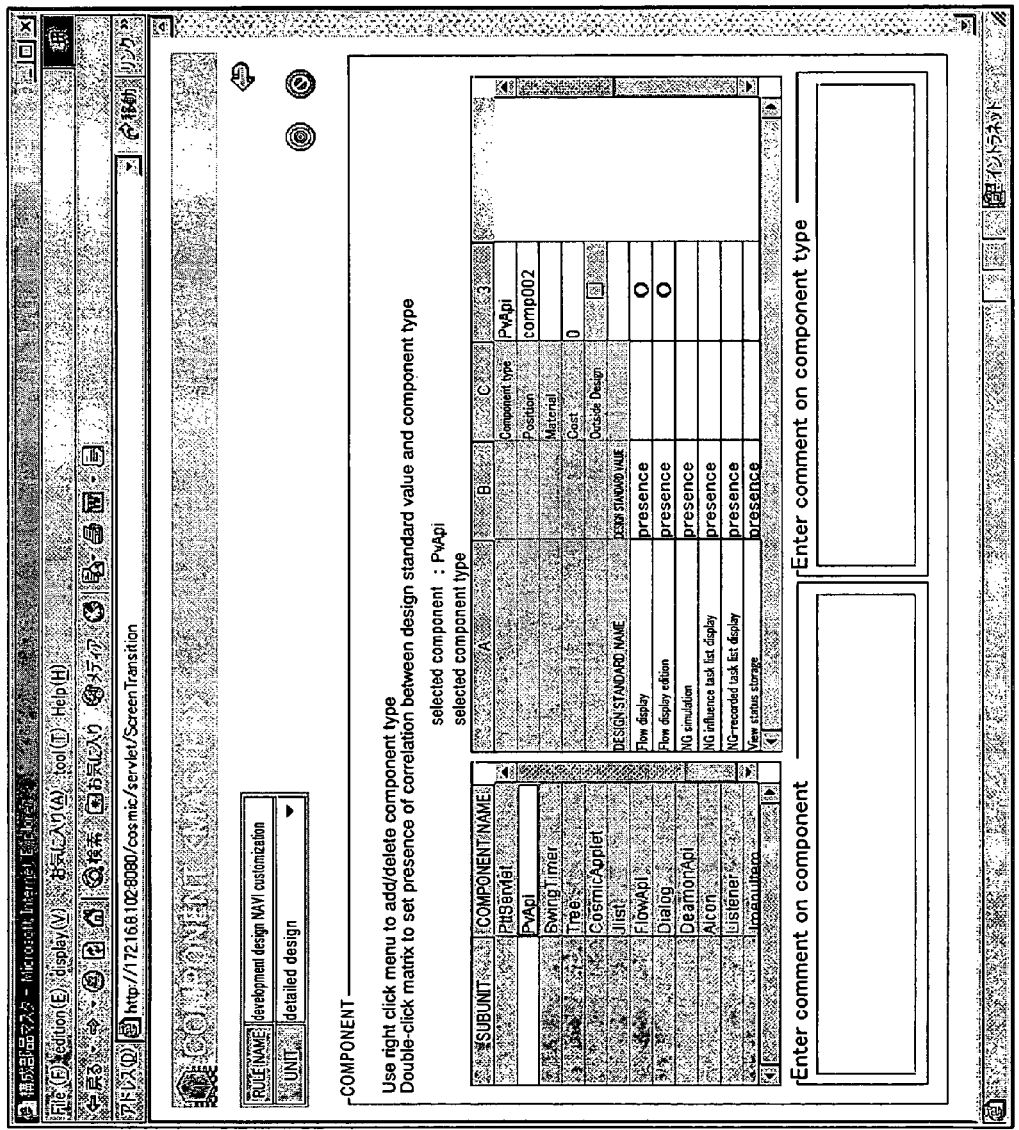
FIG. 8 is a diagram showing a window for setting the correlation between required-specification items and software-component items.

Then, required-specification items are registered, and the correlations between related required-specification items and software-component items are set up (S106 to S109). FIG. 8 shows a window for setting the correlations between the required-specification items and the software-component items.

In the similar manner as that in the sorting of software-component items and development-task items, a skilled operator sorts out required-specification items in the setup mode (106). The term "required specification" corresponds to a specification of a software product, which is requested from a user of the software product to a development section. The skilled operator pre-sorts specification items supposed to be requested from the user, and registers the sorted specification items. In this process, the skilled operator sets the correlations with software-component items capable of achieving the respective sorted specification items.

When an order for developing a software product is given from a user, a skilled operator can figure out required software component items in accordance with a required specification submitted together with the order, and his/her own experiences. However, an operator inexperienced in software development cannot figure out software component items required for achieving the required specification only by his/her own experiences in some cases. From this point of view, in this setup mode, the skilled operator sorts out conceivable required specification items, and sets the correlations between the sorted required-specification items and the software-component items required for achieving the respective required-specification items, using his/her experiences and knowledge.

On a column titled "component name" on the left side of FIG. 8, class names as software-component items of Java are vertically enumerated. The enumerated classes correspond to the items registered as a software component in the window displaying the tree in FIG. 2. That is, the item registered as a software component through the window in FIG. 2 is automatically enumerated on this column.

A column A on the right side of the "component name" column enumerates "Flow display" and others, which are required-specification items conceivable in advance. These enumerated required-specification items are extracted from the required-specification items, which are pre-sorted, reviewed in necessity, and registered in the database of the system by the skilled operator. In other words, it can be said that each of the required-specification items is individual one of various functions capable of being achieved by the intended software product.

For example, a 3rd item of "NG simulation" is a function of simulating an influence on development-task items which have already been completed in a stage where the development has gone on to some extent, to be caused by an action of returning a job for one of the completed development-task items to its early stage, due to alteration of one required-specification item for some reason. Thus, the need for this function can be varied depending on intension of a user who gives an order for this navigation system.

Returning to the spreadsheet on the right side of FIG. 8, this spreadsheet is generally formed as a matrix structure having the column A vertically enumerating the required-specification items, and the 2nd row horizontally enumerating the classes, which are enumerated on the "component name" column on the left side of FIG. 8.

The window in FIG. 8 is in the state after a class "PvApi" on the "component name" column is selected. As seen from the 3rd column of the right spreadsheet, the same "PvApi" is displayed thereon. Then, checking this 3rd column vertically, a circular mark is displayed in each of two cells intersecting with the required-specification items "Flow display" and "Flow display edition", respectively. This indicates that each of the required-specification items "Flow display" and "Flow display edition" are commonly correlated with the class "PvApi". These circular marks result from the registration made by a skilled operator based on his/her knowledge that the class "PvApi" can be used to achieve both the required-specification items "Flow display" and "Flow display edition", so as to set the correlation between the software-component item "PvApi" and each of the required-specification items "Flow display" and "Flow display edition". The correlations between some of the required-specification items and one of the software-component items can be set in such a visually distinguishable manner of attaching a circular mark to a given cell. In the same manner, all of the correlations between the required-specification items and the software-component items will be sequentially set up.

Through the operations described in connection with FIGS. 1 to 8, the software-component items, the development-task items and the required-specification items, which are supposed to be required for developing softwares belonging to a category of navigation systems, are sorted out, and the correlations between the software-component items and the development-task items and between the required-specification items and the software-component items are set up. The above operations are performed in the setup mode to establish a master of software products belonging to a certain category.

FIGS. 9 to 17 are explanatory diagrams of the execution mode for actually performing the development of a software product by use of the master established in the setup mode. In this embodiment, while a job to be executed using a window in FIG. 9 belongs to the execution mode, it is executed in advance of actual detailed-design jobs, typically by a skilled operator of some experience.

Figure 9:
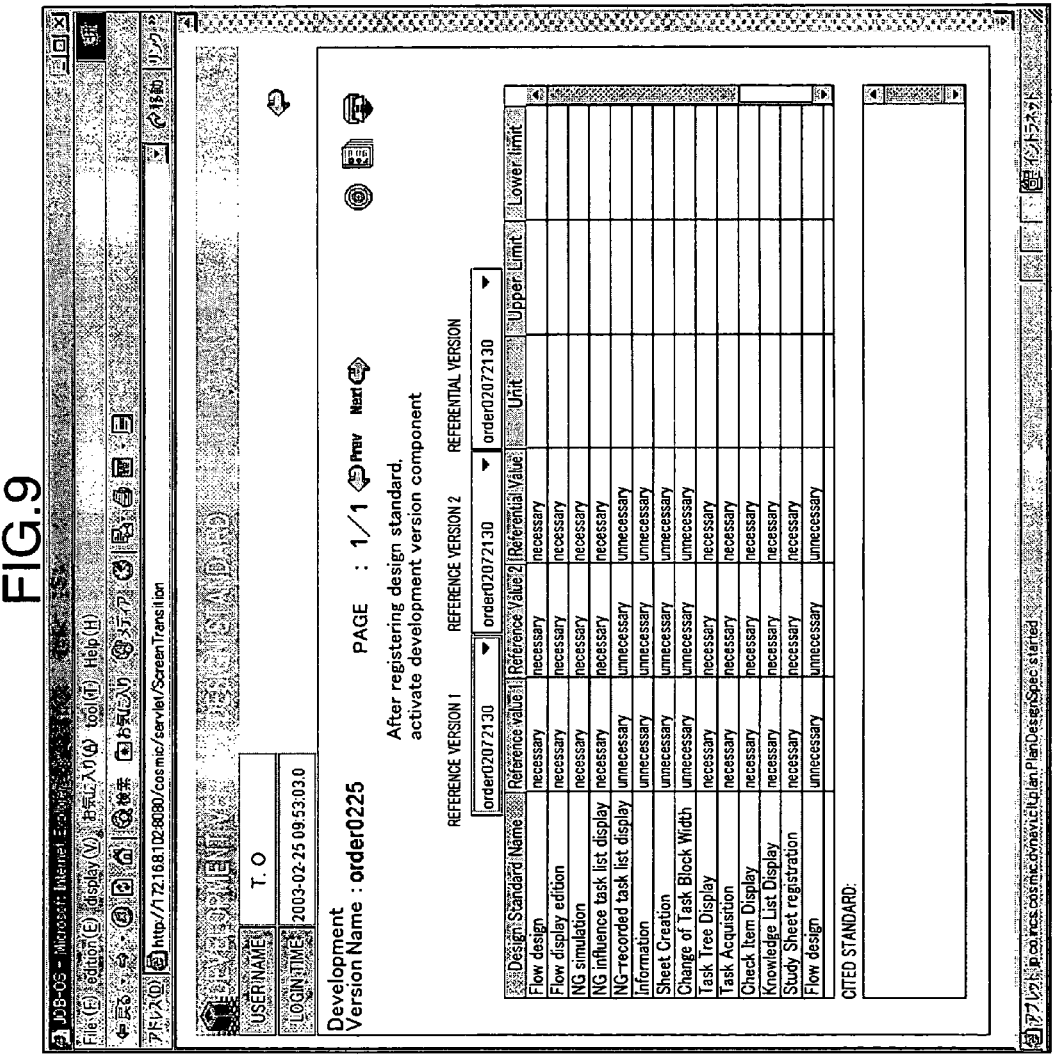
FIG. 9 is a diagram showing a window for executing a job for determining required-specification in an execution mode.

FIG. 9 shows a spreadsheet enumerating required-specification items on a column "design standard name" thereof. These required-specification items are the same as those on the column A in FIG. 8, which have been enumerated as items required for navigation systems by a skilled operator in the setup mode. An operator will execute jobs in a manner of entering required data. For example, specific jobs in the execution mode are executed while making arrangements between the operator and a user who made an order for a software product.

The navigation system according to this embodiment is configured such that the operator can refer to and divert data on previously developed software products belonging to the same category as a target software product to be developed. A box titled "reference version 1" in FIG. 9 displays a version name "order02072130", which indicates that the content of a required specification of a software product developed for this version is displayed for reference. Further, a box titled "referential version 1" displays the version name "order02072130", which is intended to recommend the diversion of required-specification items of this version as much as possible in view of the highest similarity between the software product developed for this version and the target software product to be developed. Columns titled "reference value 1", "reference value 2" and "referential value" displayed below the "referential version 1" box indicate the content of the required specification of the software product developed for this version. While the three versions displayed as an example are the same only for the sake of simplicity, these are actually different from each other in many cases.

For example, as seen from a required-specification item "Flow display" on the top of a column titled "design standard name", the items of all of versions are displayed as "necessary". Further, as seen from a required-specification item "NG-recorded task list display" on the 5th row from the top of the "design standard name" column, the items of all of versions are displayed as "unnecessary". In this window, the term "job" means an operation in that the operator enters a value such as the above "necessary" or "unnecessary".

While the data of the design standard name displayed in FIG. 9 are indicated as "necessary" and "unnecessary" by way of illustration, a specific numerical number can be entered depending on the items of the design standard. For example, in some specifications, the content of a software is varied according to the number of users who simultaneously operate the system. Thus, it is likely that the predicted number of users who simultaneously operate the system enters, or the priority between usability and response enters in a selectable manner.

Further, it is assumed that a new required-specification item can be given during arrangements with the user. In this case, an additional operation may be made in the setup mode, in such a manner that a software component for achieving this specification is developed by a skilled operator separately, and the developed software component and related required-specification items are registered and correlated with each other using the window in FIG. 8. Thus, if the same specification is given from a user in the development of another new software product in future, the above developed software component can be used and incorporated into this new software product. The data continuously accumulated in this way can extend the applicability of the master, and thereby contribute to providing enhanced operating efficiency of development task.

Figure 10:
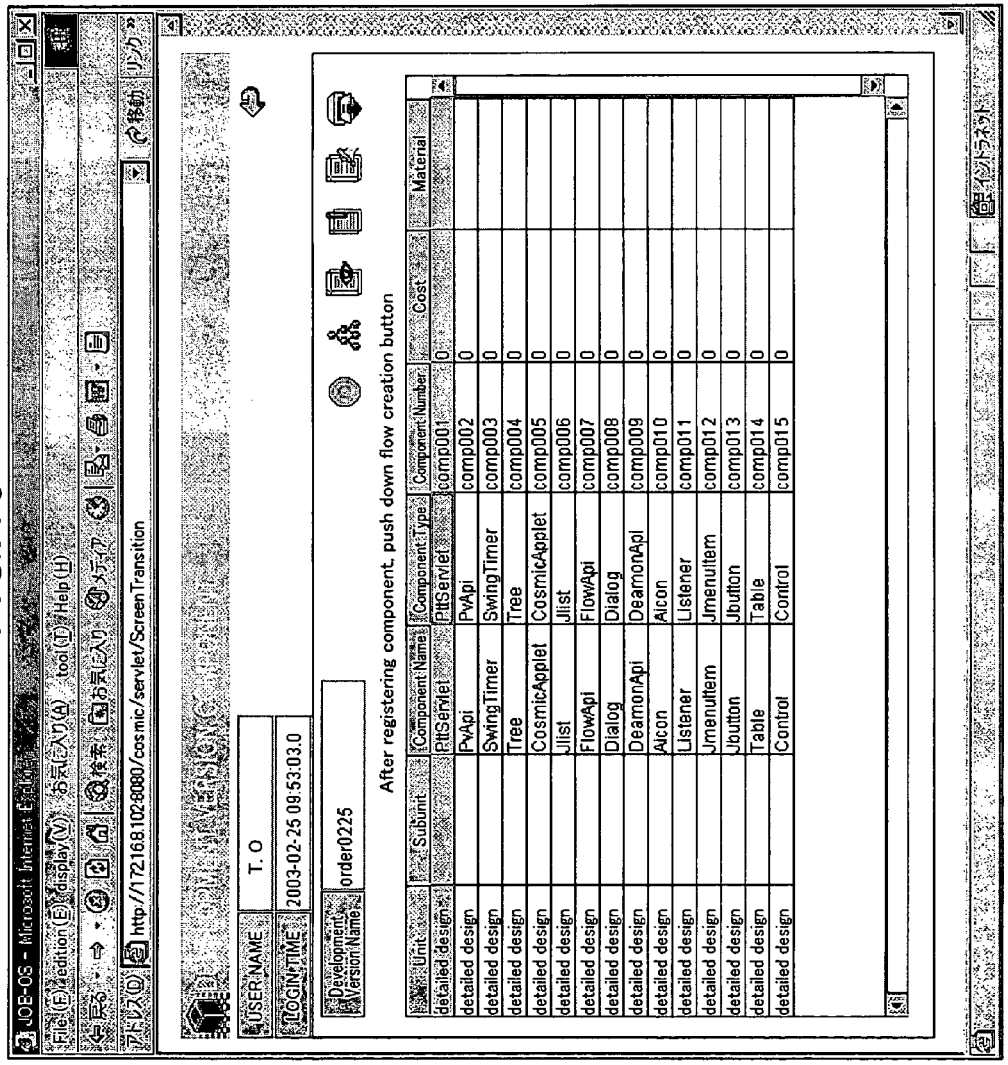
FIG. 10 is a diagram showing a window displaying a software component which is correlated with design standard names (required specifications) defined as "necessary" on the window in FIG. 9, and then extracted from a database in accordance with the correlation information set up through the window in FIG. 8.

FIG. 10 shows the state after software-component items correlated with the design standard names displayed as "necessary" (required-specification items) are extracted from the database in accordance with the correlation information set up through the window in FIG. 8, and displayed. That is, when a required specification on a software product to be newly developed is given from a user, an operator in charge of the development can simply enter information about the required specification, such as "necessary" and "unnecessary", through the window in FIG. 9, to extract software-component items required for the new software product and display them as shown in FIG. 10. While the operator is then required to determine whether all of the extracted software-component items are used and/or whether any other software component is added thereto, to finalize software-component items to be used, the final software-component items can be readily determined as compared to the conventional process. The operator can efficiently perform development task using the finalized software-component items.

Figure 11:
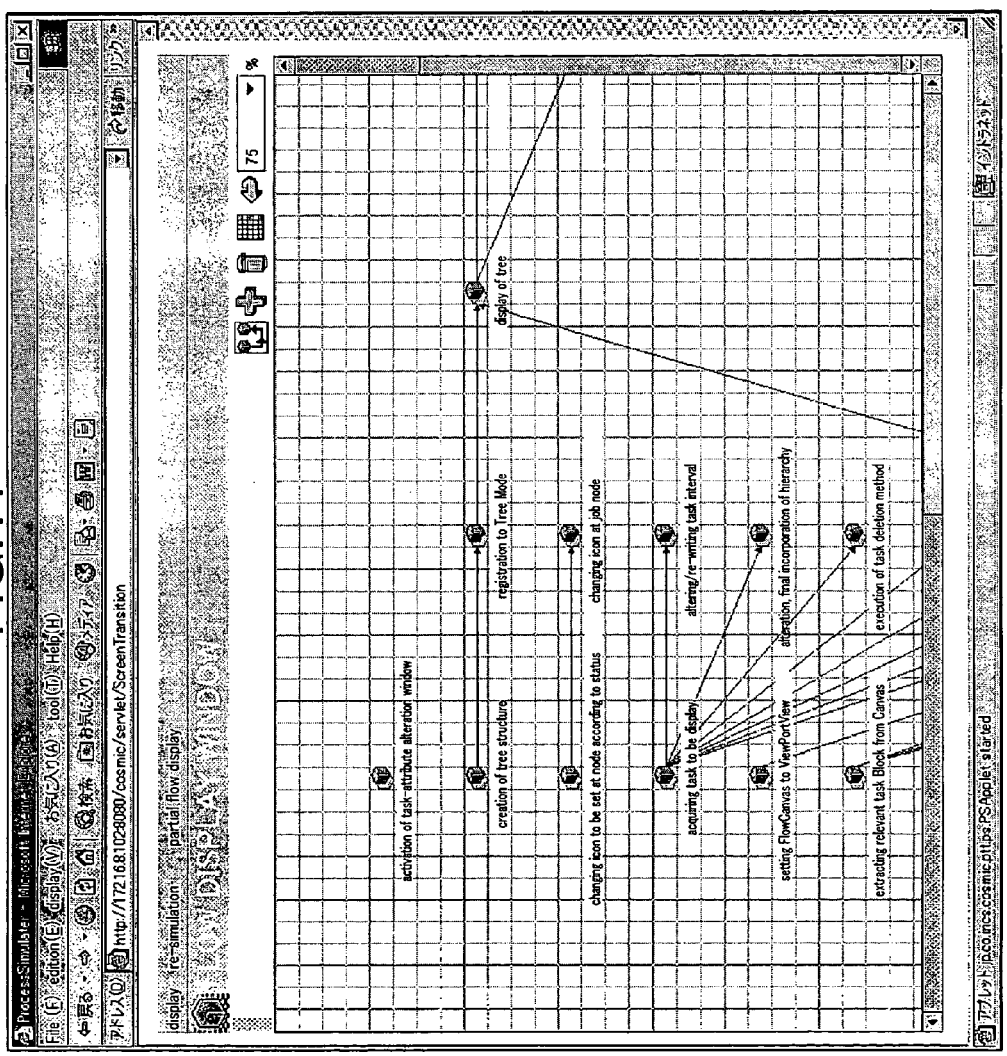
FIG. 11 is a diagram showing a job flow diagram created by a computer in accordance with information obtained through previous process.

The navigation system according to this embodiment is configured to allow a computer to automatically create a job flow diagram as shown in FIG. 11 in accordance with the obtained informations as described above. In FIG. 11, the horizontal axis represents the temporal lapse in the development process.

The job flow diagram in FIG. 11 is similar to that in FIGS. 6 and 7. However, differently from the job flow diagram in FIGS. 6 and 7 which includes all development-task items, the job flow diagram in FIG. 11 shows a development process flow of a software product to be newly developed (i.e. a specific navigation system). Specifically, the job flow diagram in FIG. 11 is displayed to present the entire job flow in accordance with the information about the "precedent task" box in the properties of the development-task items which are extracted from all of the development-task items as shown in FIGS. 6 and 7 through the operations described in connection with FIG. 1 to 9. An operator or engineer who performs the development in the final stage can check this job flow diagram not only to visually recognize presently executable jobs but also to figure out the status of his/her job in execution, in the entire development task.

As above, operations in the first half of the execution mode have been completed. The obtained informations though the aforementioned process is transmitted to an operator or engineer who executes jobs in the last half of the execution mode or specific development task, through a network. Specifically, a programmer will execute the development-task items one by one in accordance with the obtained informations though the aforementioned process.

Figure 12:
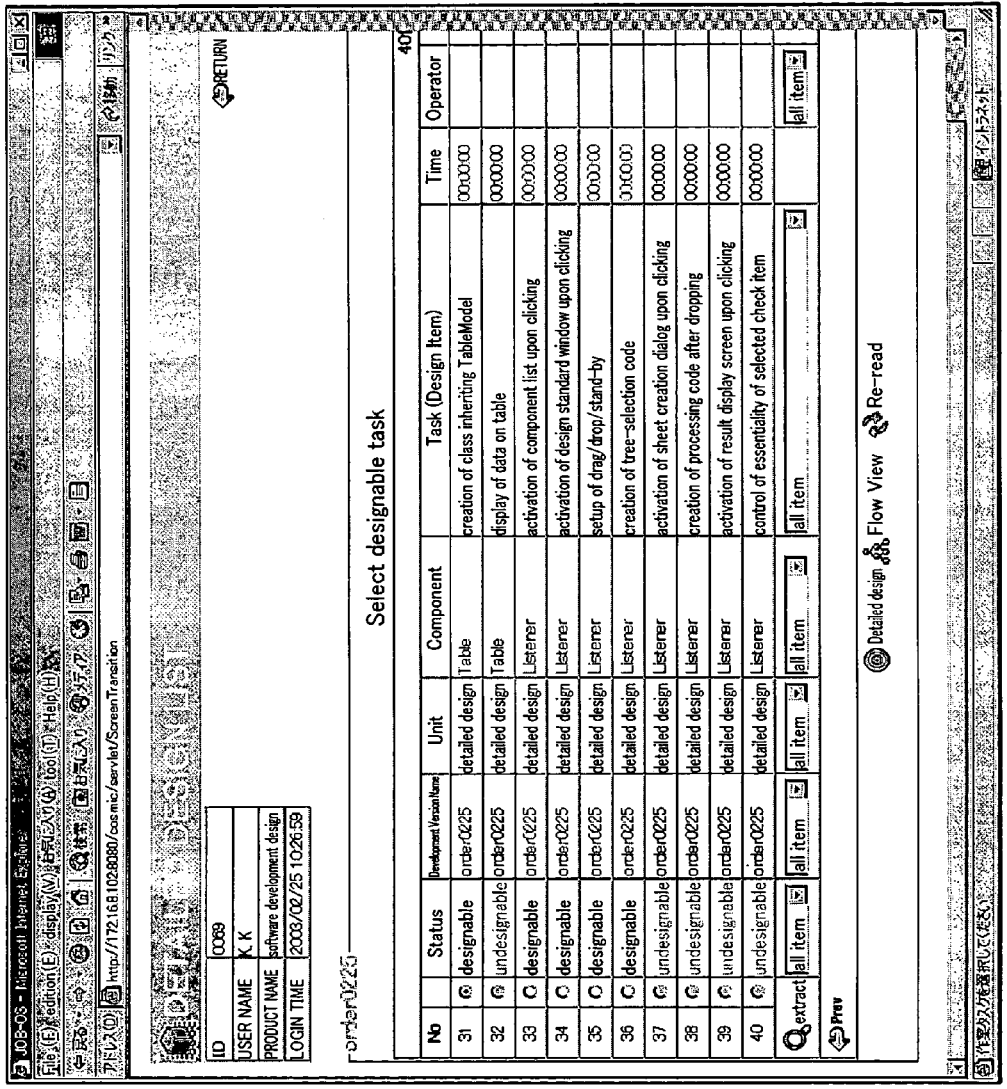
FIG. 12 is a diagram showing a window which displays a list of development-task items to be executed by an operator.

FIG. 12 shows a window prepared for an inexperienced operator who actually performs the development task, wherein a list of development-task items (development task) to be essentially executed by the operator is displayed. While not clear from this figure, rows of No. 31 and Nos. 33 to 36 are displayed with blue, and other rows are displayed with black on an actual terminal screen. The former rows display presently executable development-task items, and the latter rows display presently inexecutable development-task items. While the window in FIG. 12 displays only a part of the entire development-task items to be executed, it typically includes a far larger number of development-task items. The remaining development-task items can be viewed by scrolling the window.

The development-task item list in FIG. 12 is in one-to-one correspondence with the job flow diagram in FIG. 11, and these two windows can be readily switched mutually. The operator selectively clicks either one of the development-task items displayed with blue to inform the computer of the initiation of a job for the selected development-task item.

Figure 13:
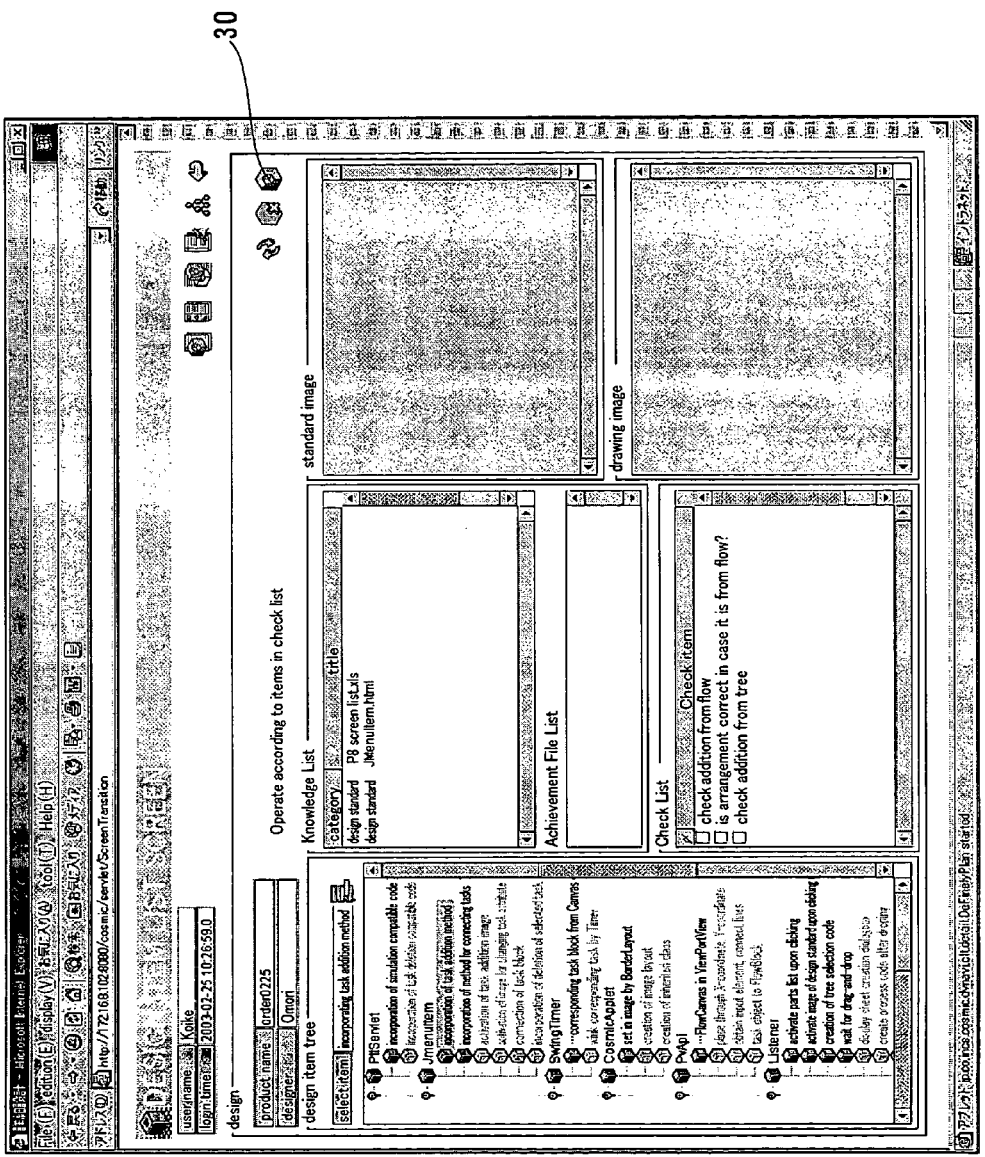
FIG. 13 is a diagram showing a window to be displayed in response to the selection of one specific development-task item from the list in FIG. 12.

FIG. 13 shows a window to be displayed in response to the selection of one development-task item or "Incorporating task addition method" as an example, from the development-task item list (this development-task item is not displayed in FIG. 12). The programmer who has selected the development-task item executes a job for "Incorporating task addition method" on another computer terminal.

A box titled "knowledge list" in the middle of a window in FIG. 13 displays a file list which is designated by an operator in charge of the setup mode, by use of a "knowhow box" on a property window for a specific development-task item as described above in connection with one example illustrated in FIG. 4. Each of the paths to the database storing these files is registered in the file list. Thus, in response to clicking, for example, on a file "PS screen list.xls" of the window in FIG. 13, Excel associated with the type of this file is activated, and the file is read and displayed. Otherwise, if a file "Jmenultem.html" displayed below the "PS screen list.xls" is clicked, Internet Explore (trademark of Microsoft Co., Ltd.) associated with the type of this file is activated, and the file is read and displayed.

Figure 14:
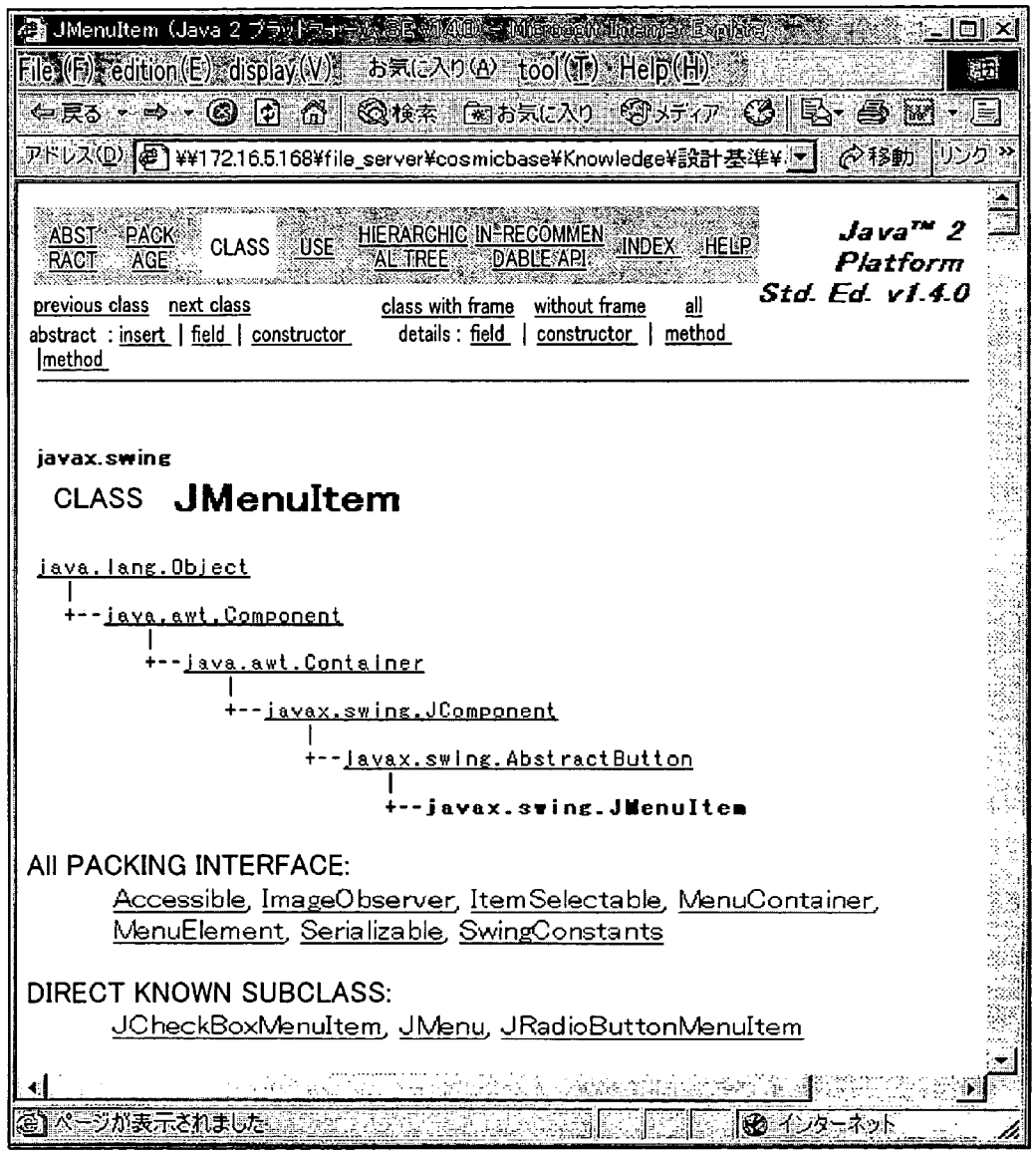
FIG. 14 is a diagram showing one example of a so-called class diagram.

FIG. 14 shows a window displayed in response to clicking on the file "Jmenultem.html". This window displays a so-called "class diagram" which indicates class for use in a programming job of "Incorporating task addition method". The operator executes the job using the displayed class as a software component according to instructions displayed on this window. This window is configured such that in response to the designation of "javax.swing.JMenultem" lowermost in the class diagram using one computer terminal, a development tool is activated on another computer terminal, and a code of this class is displayed thereon. In this manner, a software capable of achieving the function of "Incorporating task addition method" can be readily obtained. Thus, even an inexperienced operator (programmer) can quickly perform the development task at a standard or higher quality level.

A box titled "achievement file list" displayed blow the above "knowledge list" box displays a file list of software products which have been actually developed by executing the development-task items in the window in FIG. 13. The "result file list" box in FIG. 13 is blank because of no achievement.

A box titled "check list" displayed blow the "achievement file list" box is configured based on information entered in the "check item" box on the property window in FIG. 4. The operator must execute jobs for all items enumerated in this box. Every time one of the jobs is completed, the operator clicks on a mark 30 displayed on the upper right of the window in FIG. 13 to inform the computer of the completion. This development-task item cannot be completed, or any other development-task item cannot be executed, unless a check mark is put in all check boxes displayed, respectively, on the right side of the check items.

Figure 15:
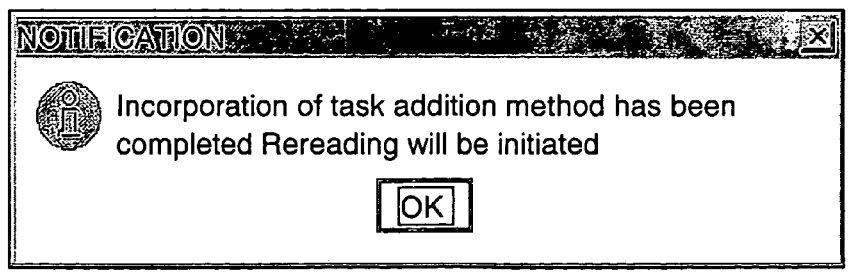
FIG. 15 is a diagram showing a window to be displayed when all of jobs for a certain development-task item is completed.

If the check mark is put in all of the check boxes, the operator can click on the mark 30 to complete this development-task item. Then, when the operator clicks on an "OK" button of a resulting displayed window as shown in FIG. 15, the completion of this development-task item is registered. Simultaneously, actually obtained data on this development-task item is registered, and personnel management data such that who has execute what kind of development-task item in what time zone is registered. The obtained data will be able to be used as the achievement data.

Figure 16:
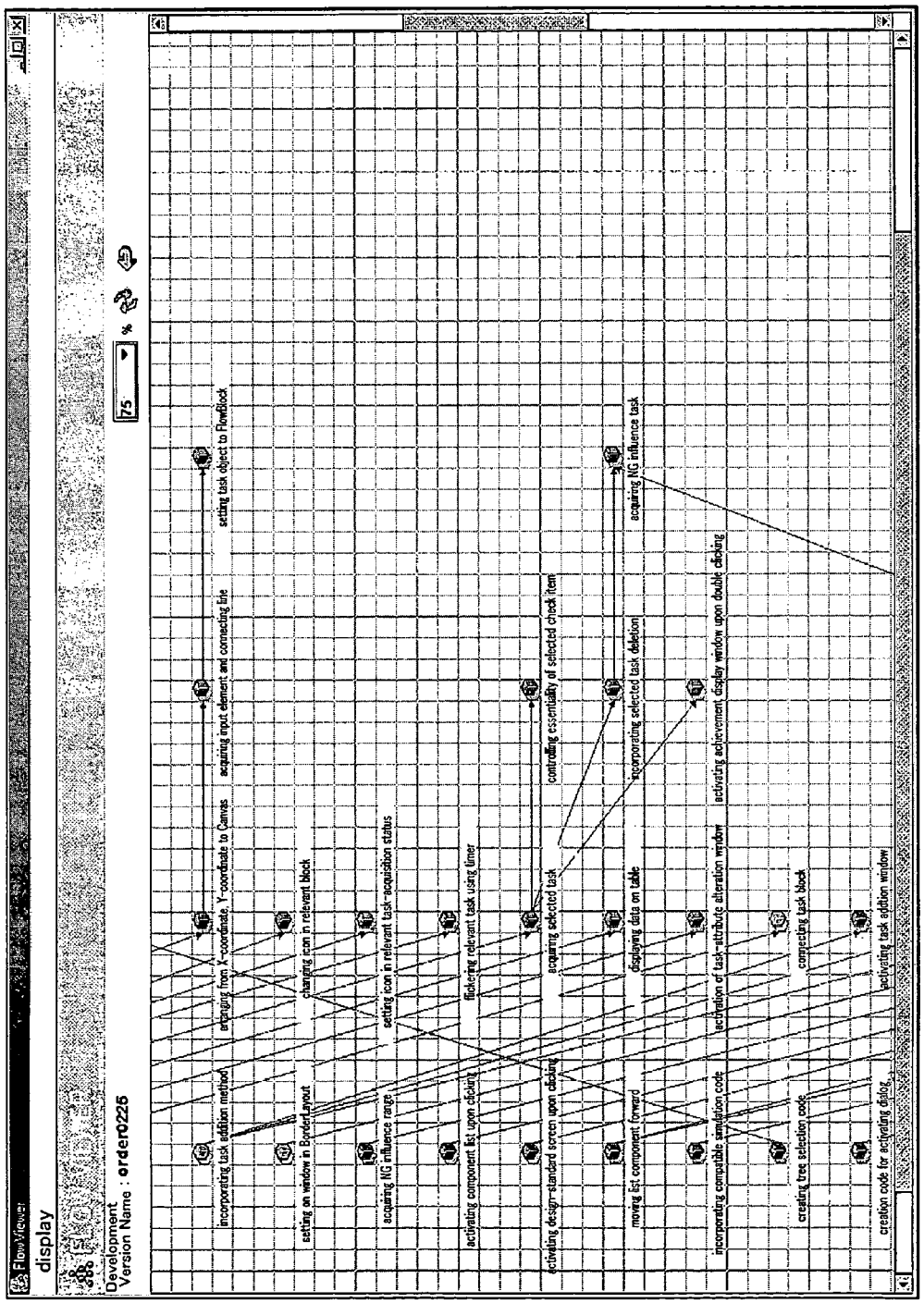
FIG. 16 is a diagram showing a job flow diagram which is displayed with color to be changed every time one of development-task items is completed.

While FIG. 16 is fundamentally the same job flow diagram as that in FIG. 11, it shows that the display is changed every time one of the development-task items is completed. Specifically, the completion of the development-task item is indicated by changing the color of an icon associated with the development-task item. Further, in order to allow a completed development-task item, an uncompleted development-task item and a development-task item in execution to be instantly distinguished, each of the items is displayed with a different color or in a different display manner such as presence of flickering. In this manner, the progress of the entire development task can be figured out visually and immediately.

Every time one of the development-task items is completed, the completion is reflected on the development-task item list in FIG. 12 to change the symbol of the "status" field of the corresponding development-task item in FIG. 12 to "design completion" and simultaneously change the display color of the corresponding row.

Figure 17:
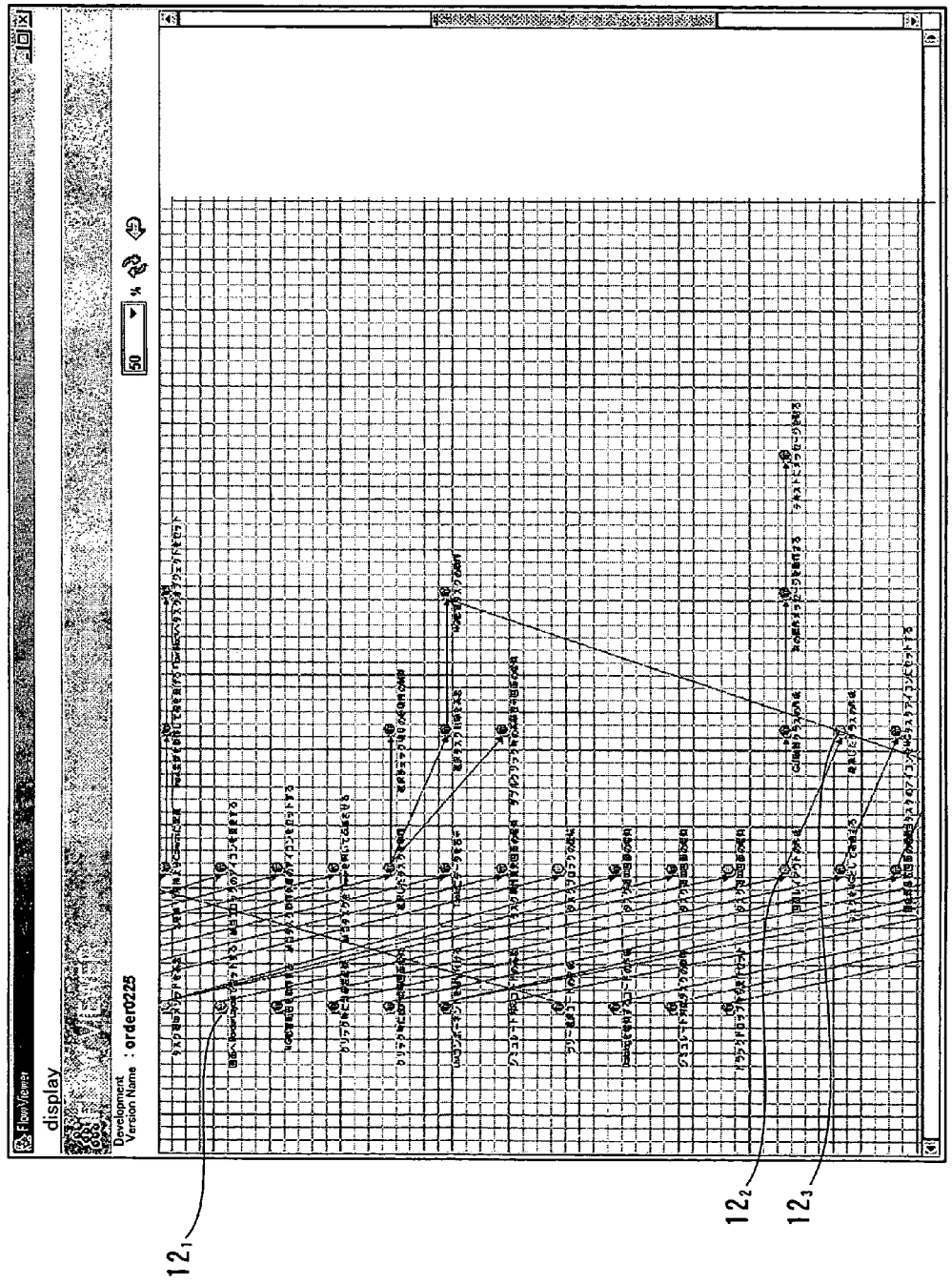
FIG. 17 is an explanatory view of a function of "NG simulation".

FIG. 17 shows the aforementioned "NG simulation" function or a function of simulating an influence on development-task items which have already been completed in a stage where the detailed design has gone on to some extent, to be caused by an action of returning a job for one of the completed development-task items to its early stage, due to alteration of one required-specification item for some reason.

Given that while three development-task items indicated by reference numerals $12_1$, $12_2$ and $12_3$ inn FIG. 17 have already been completed, the development-task item $12_1$ is changed in specification in the course of jobs therefor. In this case, an operator clicks on an icon of the development-task item $12_1$ with the right mouse button. Then, when the operator selects "NG simulation from resulting displayed several options, the color of icons of the development-task item $12_1$ and the development-task items $12_2$ and $12_3$ influenced by the development-task item $12_1$ are changed to red.

This function can be effected in accordance with the information specified as a previous task in the "previous task" box on the property edition" window in FIG. 4. In this way, the operator can figure out visually and immediately that the change in specification of the development-task item $12_1$ causes the need for redoing the jobs for the development-task items $12_2$ and $12_3$ but no need for redoing the jobs for the remaining development-task items. Then, the operator re-executes the jobs for the development-task items $12_1$, $12_2$ and $12_3$ displayed with the changed color or red, according to the changed specification.

In the navigation system according to this embodiment, a plurality of operators who actually execute jobs in the execution mode can share the jobs on each of thire independent computers to develop a common software product while executing respective allocated development-task items in collaboration with each other. Further, each of the operators can figure out the progress of the entire development task and the executable development-task item, immediately by checking the job flow diagram in FIG. 11 or the displayed list in FIG. 12, so as to prevent the same development-task items from being executed by them overlappingly and inefficiently The development of the software product is accomplished when all of development-task items in FIG. 12 are completed, and then the software product can be incorporated into intended products in a conventional manner.

As mentioned above, according to the present invention, in the setup mode, a skilled operator can readily accumulate informations requited for developing software products while setting the correlations between the informations without any difficulty, to establish information (master) required for developing software products belonging to a certain category. Further, in the execution mode, the master established in the setup mode can be used to navigate job content of an operator in such a manner that even if the operation is inexperienced in software development, he/she can quickly perform the development of the software product while maintaining a standard or higher quality level.

What is claimed is:

1. Computer readable medium for use with a computer to support an operator who performs the development of software products belonging to a given category comprising program instructions for:

an item registration function of registering in a database respective items of software components, development tasks and required specifications, which are enumerated as the requirement for performing development of software products belonging to said given category;

an ordinal relationship registration function of enabling ordinal information with respect to said development task items to be registered in said database in such a manner that a specific development task item can be initiated only after the completion of one or more other development-task items:

a correlation information registration function of enabling an operator to set up the correlations between any two of said software components, said development tasks and said required specifications which have been registered by said item registration function, with respect to each of the items thereof, and for registering information about said correlations in said database;

a required-specification determination function of presenting said required-specification items to an operator in the development of a specific one of the software products belonging to said given category, to prompt said operator to determine the content of a final required specification for said specific one of the software products belonging to said given category while performing addition, alteration and/or deletion on said required-specification items, as required and for registering said addition, alteration and/or deletion in said database;

a software-component determination function of extracting the software-component items correlated with said determined required specifications from said database in accordance with said determined required specifications and said correlation information for said specific one of the software products belonging to said given category, and presenting said extracted software-component items to an operator so as to prompt said operator to determine a final software component while performing addition, alteration and/or deletion on said extracted software-component items, as required and for registering said addition, alteration and/or deletion in said database;

a development task extraction function of extracting from said database the development task items correlated with said determined software component, in accordance with said determined software component and said correlation information, and presenting to an operator any development-task item which can be initiated at that time in the development of the software product, in accordance with said registered ordinal information; and a development task support function of presenting to an operator the contents of one or more of said development-task items which can be executed at each time point after said operator initiates a job for one of said executable development-task items, in accordance with said selected development task item, to support said operator on the execution of said job.

2. The computer readable medium as defined in claim 1, containing further program instructions for an enumeration function of enumerating a plurality of job items to be executed by an operator while executing one of said development task items, and enabling each of said job items to be marked when completed; and a completion function of enabling each said development task item to go into its completed status only after all of said job items of said development task item are marked.

3. A system for supporting an operator who performs the development of software products belonging to a given category, said system comprising:

item registration means for registering in a database respective items of software components, development tasks and required specifications, which are enumerated as requirements for performing development of software products belonging to said given category;

ordinal relationship registration means for ordinal information with respect to development-task items to be registered in said database in a manner to specify that a development-task item can be initiated only after the completion of one or more other development-task items;

correlation information registration means for enabling an operator to set up the correlations between said software components, said development tasks and said required specifications which have been registered by said item registration means, with respect to each of the items thereof, and for registering information about said correlations in said database;

required-specification determination means for presenting said required-specification items to an operator in the development of a specific one of the software products belonging to said given category, to prompt said operator to determine the content of a final required specification for said specific one of the software products belonging to said given category while performing addition, alteration and/or deletion on said required-specification items, as required, which additions, alterations and/or deletions are incorporated in said database;

software-component determination means for extracting the software-component items correlated with said determined required specifications from said database in accordance with said determined required specifications and said correlation information for said specific one of the software products belonging to said given category, and presenting said extracted software-component items to an operator for determining a final software component while performing addition, alteration and/or deletion on said extracted software-component items, as required which additions, alterations and/or deletions are incorporated in said database;

development task extraction means for extracting from said database the development-task items correlated with each said determined software component, in accordance with said determined software component and said correlation information, for presentation to an operator one or more of the development-task items which can be initiated at that time in the development of the software product, in accordance with said registered ordinal information; and a development task support means for presenting to an operator the contents of said one or more development-task items available to be executed at each time point after said operator initiates a job for one of said executable development-task items, in accordance with said selected development-task item, and for supporting said operator on the execution of said job.

4. The system as defined in claim 3, which further includes:

enumeration means for enumerating a plurality of job items to be executed by an operator while executing one of said development-task items, and enabling each of said job items to be marked when completed; and completion means for enabling each said development-task item to go into its completed status only after all of said job items of said development task item are marked.

* * * * *